United States Patent Office 2,915,366
Patented Dec. 1, 1959

2,915,366

CALCINATION OF BARIUM CARBONATE

Henry W. Rahn, Pittsburgh, Pa., and Charles J. Sindlinger, Corpus Christi, Tex., assignors to Columbia-Southern Chemical Corporation, Allegheny County, Pa., a corporation of Delaware No Drawing. Application November 5, 1956
Serial No. 620,463

6 Claims. (Cl. 23—186)

This invention is directed to a novel method of calcining barium carbonate to barium oxide.

Barium carbonate may be calcined by heating at a temperature above 1360° C. However, such serious fusion occurs that the process is hardly practical. On the other hand, where carbon is present and the reaction is conducted in a stream of inert gas, such as nitrogen, the reaction proceeds at a much lower level, usually ranging between 800 to 1100° C. This is particularly advantageous because the reaction must be conducted using an indirect method of heating since it simplifies the problem of obtaining metals or other heat-conductive materials of construction which will withstand the chemical and mechanical attack inherent in the process.

According to the present invention, it has been found that barium carbonate can be effectively calcined by heating the barium carbonate in a stream of a gaseous hydrocarbon containing 1 to 4 carbon atoms under conditions such as to crack the hydrocarbon, and calcining the resulting barium carbonate-carbon mixture. In the practice of this process, it is preferred to treat barium carbonate in the form of granules made up of fine particles, of a size below 100 mesh, aggregated together by a carbonizable binder, such as wheat starch, corn starch, sugar, glue, syrups, molasses. These granules, having a particle size of 4 to 80 mesh, are dried at 100–150° C. to reduce the water content thereof below about 0.1 percent by weight, and thereafter are ready for use.

It has been discovered that when the barium carbonate is heated in a stream of methane or the like, the hydrocarbon cracks to deposit carbon on the barium carbonate granules. This is highly surprising since it might well be expected that if the methane cracked during the reaction, the carbon might well deposit upon all portions of the reactor rather than upon the barium carbonate. Actually, the carbon which is formed by cracking of the methane is deposited in the pores of the barium carbonate granules and in such intimate contact that the introduction of methane effectively serves the same purpose as the incorporation of carbon in the granules.

Moreover, even partial decomposition or calcination of barium carbonate is permitted when methane is used. Carbon tends to reduce fushion, and when no carbon is added to the particles, serious fusion results during calcination. While less than the stoichiometric amount (6 percent of the barium carbonate) may be used, the tendency toward fusion gradually increases and becomes quite serious when only 3 or 4 percent by weight of carbon, based upon the barium carbonate, is used. When methane is used, however, this does not appear to be the case.

Quite probably, the fusion is due to the presence of barium oxide which forms a barium oxide eutectic. On the other hand, the barium oxide is not formed at the relatively low calcination temperatures used in the practice of this process, for example, 800 to 1100° C., unless carbon is present. When methane is used as the primary source of carbon, it follows that the calcination can only occur where the carbon has been deposited by virtue of methane cracking. Since the localized deposition of carbon due to cracking of methane will result in localized calcination of the barium carbonate and since the deposited carbon inhibits fusion where calcination takes place, fusion does not tend to occur. Consequently, a partial decomposition or calcination of barium carbonate readily becomes more feasible when methane is used.

Gaseous hydrocarbons other than methane, including ethane, propane, butane, vapors of petroleum naphtha, benzene, and like gases which, upon heating at the elevated temperatures herein contemplated will crack to form carbon, without serious tar formation may be used according to the present invention.

The calcination may be effected using both methane, or like hydrocarbon, and elemental carbon. In such a case, a deficiency of carbon (less than 6 percent, for example, 1 to 4 percent by weight) may be incorporated in the granules prior to calcination, and the hydrocarbon used to supply the balance of the carbon.

The following examples are illustrative of the process involving use of methane:

*Example I*

Granules were prepared from a mixture of 1 part by weight of wheat paste and 100 parts by weight of barium carbonate, no carbon being used. These granules were produced by extrusion, drying, crushing, and sizing. The barium carbonate granules thus obtained were fed to the reactor at a rate of 6.2 pounds per hour. Methane was fed into the reactor at a rate of 285 cubic feet per hour, measured at a pressure of 760 millimeters and a temperature of 70° F. The temperature of the reaction bed was maintained at approximately 975° C. during the run, and the barium oxide content of the bed remained at 90 to 92 percent by weight of the bed. The calcination was carried out for a period of 5 hours, and the product withdrawn contained 90 to 92 percent of barium oxide. The bed did not fuse or stick during the run.

*Example II*

A fluidized bed of baked barium carbonate granules having a particle size such that 100 percent passed through 14 mesh and remained on 30 mesh was established. These granules were prepared by mixing together 4 parts by weight of carbon and 1 part by weight of wheat starch per 100 parts by weight of barium carbonate and drying the product. These granules were fed to the reactor at a rate of 14.4 pounds per hour. Nitrogen pre-heated to a temperature of approximately 550° C., flowing at a rate of 200 to 285 cubic feet per hour, and measured at 760, was mixed with a stream of cold methane flowing at a rate of 56 cubic feet per hour. These gas flows were measured in terms of the flow at 70° F. and 760 millimeters pressure. The resulting gas mixture was fed into the bottom of the reactor and was used to maintain the fluidized bed. The operation was continued over a period of 7 hours and the resulting product was continually withdrawn during the run. This product contained 92 to 97 percent BaO. There was no detectable scaling of the reactor wall or fusion of the reaction mixture.

*Example III*

The feed was a mixture of 7 parts by weight of carbon, 1 part by weight of wheat paste, and 100 parts by weight of barium carbonate, the particles which were greater in size than 14 mesh, or less than 30 mesh, being screened out. The feed of these granules was 10.4 pounds per hour. The nitrogen was heated in the pre-heater at a temperature of about 500° C. and fed into the reactor at a rate of 225 cubic feet per hour. Prior to introducing the nitrogen into the reactor, it was mixed with cold methane introduced at a rate of 50 cubic feet per hour. These gas flows are expressed in terms of their volume at 760 millimeters pressure at 70° F. This mixture was fed into the bottom of the reactor and used to establish the fluidized bed. The temperature of the reaction bed was maintained at 950° C. throughout the run. The run was continued for a period of 3¾ hours at these conditions, and the product which was withdrawn continually during the run contained 93 to 95 percent BaO. No scale or deposit was apparent on the tube wall, and no accumulation of scale or fused product developed within the reactor.

The barium carbonate used in the runs was substantially all barium carbonate containing small amounts, usually not in excess of about 1 or 2 percent of barium hydroxide and, in some cases, a small amount of sulfur, usually not in excess of about ½ to 1 percent. The gas escaping from the beds in the above runs contained less than 30 percent by volume of carbon monoxide and no carbon dioxide.

While calcination in a fluidized bed is found to be especially effective, other methods of calcination may be resorted to. For example, the granules prepared as described above or even a finely divided mixture of barium oxide, barium carbonate and carbon may be placed on a rotary hearth, or like heating apparatus, and calcined in a stream of inert gas. To avoid or minimize fusion, it is usually desirable to mix the barium carbonate with previously calcined granules. Thus, a portion of the calcined product may be recycled and mixed with barium carbonate entering the furnace, as has been explained above. In such a case, the barium oxide content of the mixture normally will exceed 50 percent of the BaO content of the mixture undergoing calcination. By such means, fusion due to the production of a low melting barium oxide eutectic may be minimized. Radiant heat may be used to heat the hearth in such a process.

Moreover the barium carbonate-carbon mixture may be prepared in other ways. For example, barium carbonate granules such as prepared according to Example I or II or other barium carbonate compositions which contain little or no carbon or like hydrocarbon may be subjected to a pretreatment with methane at cracking temperatures for example 400–800° C. in order to deposit carbon upon the barium carbonate. Such granule may be calcined in the usual manner for example according to the method shown in Example I.

Barium oxide which is produced by this process may be used for many purposes. It may be reacted with air to produce barium peroxide or with acids to produce various barium salts. It also may be hydrated to produce barium hydroxide.

According to a further embodiment barium oxide granules preheated to a temperature above calcination but below fusion temperatures may be introduced into a fluidized bed such as that described in the Examples I to III. By this means, additional heat may be introduced into the calcining chamber thus reducing the amount of heat which must pass through the walls of the chamber and permitting use of more refractory and less heat conductive materials of construction. The barium carbonate granules also may be preheated to reaction temperature or somewhat below, for the same purpose.

According to the provisions of the patent statutes, the principle and mode of practicing the invention have been described, together with illustration of what is now considered to represent its best embodiment. However, it is to be understood that, within the scope of the appended claims, the invention may be practiced otherwise than as specifically illustrated and described.

This application is a continuation-in-part of our copending applications, Serial No. 279,786, filed April 1, 1952, now Patent No. 2,772,950, and Serial No. 514,562, filed June 10, 1955, now Patent No. 2,772,948.

What is claimed is:

1. The method of calcining barium carbonate with carbon to produce barium oxide comprising suspending porous barium carbonate in an upwardly rising stream of a gaseous hydrocarbon, heating said carbonate at a temperature of at least the cracking temperature of said hydrocarbon, cracking said hydrocarbon to produce and deposit carbon on said barium carbonate to provide a mixture of carbon and barium carbonate, the carbon in said mixture being principally produced by the cracking of said hydrocarbon, said mixture containing at least 6 percent by weight carbon based on the weight of barium carbonate, and calcining said mixture to produce barium oxide.

2. The method of claim 1 wherein said gaseous hydrocarbon contains from 1 to 4 carbon atoms.

3. The method of claim 1 wherein the gaseous hydrocarbon is methane.

4. The method of claim 1 wherein said barium carbonate is heated to a temperature in the range of from 800° C. to 1100° C.

5. The method of claim 1 wherein said porous barium carbonate comprises granules the preponderate portion of which are of a size of 40 to 80 mesh, the upwardly rising stream of gaseous hydrocarbon flows at the rate of 1 to 10 feet per second and the rate of calcination and the rate of hydrocarbon introduction are correlated so that the evolved gas flowing from the granules contains less than 30 percent by volume of carbon monoxide.

6. The method of claim 1 wherein said porous barium carbonate comprises granules containing a minor amount of the carbon required to produce barium oxide, the major amount of carbon required to produce barium oxide being that supplied by the cracking of said hydrocarbon.

References Cited in the file of this patent

UNITED STATES PATENTS

| 1,067,595 | Ekstrom | July 15, 1913 |
| 2,602,019 | Odell | July 1, 1952 |
| 2,772,950 | Rahn et al. | Dec. 4, 1956 |

FOREIGN PATENTS

| 13,519 | Great Britain | A.D. 1897 |

OTHER REFERENCES

Gardiner: "Chemical Synonyms and Trade Names," Crosby, Lockwood and Son, London, 1924, pp. 91, 117, 207.

Lange's "Handbook of Chemistry," 9th ed., pp. 820–821.